UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

ELECTRODE.

1,075,713.     Specification of Letters Patent.     Patented Oct. 14, 1913.

No Drawing.     Application filed May 1, 1912. Serial No. 694,514.

*To all whom it may concern:*

Be it known that I, JOSEPH L. R. HAYDEN, a citizen of the United States, residing at Schenectady, county of Schenectady, State of New York, have invented certain new and useful Improvements in Electrodes, of which the following is a specification.

My invention has reference to an electrode of the flaming type in which, as is well known, most of the light is emitted from the arc instead of from the incandescent tip or tips of one or both of the electrodes, as is the case when simple carbon electrodes are used.

In a former application, Serial No. 571,105, filed July 9, 1910, I have pointed out that while the titanium arc is white and efficient, it is generally unsteady, and that its operation is greatly improved by the addition of a fluorin compound, and that the fluorin may be introduced as an element of a compound in which not only a metal other than titanium is present, but in which titanium is also present, as in that case a larger amount of fluorin relative to the metal other than titanium, may be introduced than would be otherwise possible. It was also pointed out that calcium titano-fluorid ($CaTiF_6$) and cerium titano-fluorid ($CeTiF_6$) are particularly valuable electrode constituents, the calcium titano-fluorid being used for a yellow light and cerium titano-fluorid for a white light. For certain conditions of operation, the total amount of fluorin may be introduced by the calcium titano-fluorid or cerium titano-fluorid, as the case may be. Under other conditions of operation, however, the arc becomes unsteady, and I have found that I can overcome this tendency by the addition to an electrode containing an earth metal titano-fluorid, an alkaline titano-fluorid, and particularly sodium titano-fluorid, potassium titano-fluorid or lithium titano-fluorid. The addition of either one of these compounds holds the earth metal titano-fluorid in suspension and causes it to be evaporated in the vicinity of the arc and the luminous vapors to continuously and evenly enter the arc. I find that certain of the titano-fluorids are somewhat unstable and form dissociation products. This is especially true of the alkaline titano-fluorids, and more particularly of lithium titano-fluorid. There appears to be a tendency to form hydro-fluoric acid which splits off, the resulting compound taking up oxygen and forming the metal oxy-titano-fluorid. The chemical action, however, as well as the resulting product, appears to be complex and is not thoroughly understood. I find, however, that the resulting material accomplishes the purpose of my invention quite as well as the pure alkaline titano-fluorids. It will be understood, therefore, when I refer in the claims to titano-fluorids, and particularly to the alkaline titano-fluorid, that I include not only the pure titano-fluorids but the dissociation products formed therefrom.

While I have mentioned calcium titano-fluorid and cerium titano-fluorid as earth metal titano-fluorids which are especially satisfactory for the purposes of my invention, other earth metal titano-fluorids may be used, and particularly I have found that barium titano-fluorid, strontium titano-fluorid and thorium titano-fluorid may advantageously be employed.

I have made an excellent electrode in accordance with my invention by using the following constituents in the following proportions:—Cerium titano-fluorid 30%; sodium titano-fluorid 5%, and the remainder carbon. Either sodium or potassium titano-fluorid, however, may be used with either calcium titano-fluorid or cerium titano-fluorid.

While I have given the proportions of the constituents suitable for making an electrode, it will be understood that these proportions can vary greatly without departing from my invention. I have found, for instance, that in some cases it is desirable to use as much as 50% of the calcium titano-fluorid or cerium titano-fluorid and that as much as 15% of the alkaline titano-fluorid may, under some conditions, be used.

While I have made excellent electrodes with the materials above enumerated, and usually prefer that the electrodes should be made entirely of such materials, under certain conditions other materials may be advantageously added. Thus I have made a good yellow flame electrode by the mixture of calcium fluorid with calcium titano-fluorid, sodium titano-fluorid and carbon. Under other conditions, particularly when a white flame electrode is desired barium fluorid can be advantageously employed in conjunction with cerium titano-fluorid, an alkaline titano-fluorid and carbon in order to counteract the yellow color resulting from the use of the alkaline titano-fluorid. It will also be understood that any suitable flux may, if desired, be added to the electrode.

I am aware of an application, Serial No. 697,314, filed May 14, 1912, in the name of Emile J. Guay, for an electrode containing an earth titano-fluorid, an alkaline titano-fluorid and barium-fluorid, together with carbon, the barium fluorid being added to correct the color value of the alkaline titano-fluorid, and I do not herein claim the method of correcting the color value of light by the addition of barium fluorid as this is not my invention.

It will be understood that in my electrode the carbon performs its usual function in a flaming electrode, that is, it gives conductivity to the electrode and furnishes conductive vapors for the arc and forms a conducting tip on the arcing end of the electrode from which the arc may be established.

What I claim as new and desire to secure by Letters Patent of the United States, is:—

1. An electrode containing carbon, an earth metal titano-fluorid and an alkaline titano-fluorid.

2. A carbon electrode containing from five to fifty per cent. of an earth metal titano-fluorid and less than fifteen per cent. of an alkaline titano-fluorid.

3. An electrode composed of from five to fifty per cent. of an earth metal titano-fluorid, less than fifteen per cent. of an alkaline titano-fluorid, and carbon.

4. An electrode containing substantially thirty per cent. of an earth metal titano-fluorid, one per cent. of an alkaline titano-fluorid, and carbon.

5. An electrode composed of an earth metal titano-fluorid, an alkaline titano-fluorid and carbon.

6. A carbon electrode containing cerium titano-fluorid and an alkaline titano-fluorid.

7. A carbon electrode containing cerium titano-fluorid and sodium titano-fluorid.

8. An electrode composed substantially of cerium titano-fluorid thirty per cent., sodium titano-fluorid one-half per cent., and carbon.

In witness whereof, I have hereunto set my hand this 30th day of April 1912.

JOSEPH L. R. HAYDEN.

Witnesses:
 BENJAMIN B. HULL,
 HELEN ORFORD.